US005790354A

United States Patent [19]

Altiti et al.

[11] Patent Number: 5,790,354

[45] Date of Patent: Aug. 4, 1998

[54] HYBRID POWER SWITCHING DEVICE

[75] Inventors: Jamil A. Altiti; Keith D. Ness, both of Winona, Minn.

[73] Assignee: Watlow Electric Manufacturing Company, St. Louis, Mo.

[21] Appl. No.: 824,281

[22] Filed: Mar. 26, 1997

[51] Int. Cl.[6] .......... H02H 3/00

[52] U.S. Cl. .......... 361/8; 361/13

[58] Field of Search .......... 361/2, 3, 5–7, 361/8, 13

[56] References Cited

U.S. PATENT DOCUMENTS

| | | | |
|---|---|---|---|
| 3,868,549 | 2/1975 | Schaefer et al. . | |
| 4,074,333 | 2/1978 | Murakami et al. | 361/13 |
| 4,392,171 | 7/1983 | Kornrumpf | 361/5 |
| 4,760,483 | 7/1988 | Kugelman et al. | 361/13 |
| 4,855,612 | 8/1989 | Koga et al. | 307/140 |
| 5,053,907 | 10/1991 | Nishi et al. | 361/9 |
| 5,283,706 | 2/1994 | Lillemo et al. | 361/3 |
| 5,528,443 | 6/1996 | Itoga et al. | 361/8 |

*Primary Examiner*—Marc S. Hoff
*Assistant Examiner*—Michael Sherry
*Attorney, Agent, or Firm*—Herzog, Crebs & McGhee, LLP

[57] ABSTRACT

A hybrid power switching device for eliminating mechanical relay arcing. The device reduces mechanical relay contact damage due to arcing and substantially reduces power dissipation by placing a solid state relay in parallel with a mechanical relay. The solid state relay is preferably a semiconductor triac optically coupled to a light emitting diode. The device takes advantage of the inherent lag time (operating time) when a mechanical relay contact switch closes. The device uses only analog components and controls the triac by means of a Schmitt trigger pulse stretcher. The advantages to the present Schmitt trigger include discrete turn off and a narrow hysteresis. A low level control voltage signal operates the mechanical relay and the Schmitt trigger, or optionally a high level control voltage signal in conjunction with a signal inverter.

13 Claims, 2 Drawing Sheets

HYBRID POWER SWITCHING DEVICE

FIELD OF THE INVENTION

The present invention relates to a relay, and more particularly, pertains to a hybrid power switching device which combines solid state relay and electromechanical relay technologies. The hybrid power switching device has the operational advantages of compact size, lower power dissipation, and lower cost compared to solid state relay technologies. Additionally, it eliminates arcing normally associated with electromechanical relay technologies.

BACKGROUND OF THE INVENTION

In the power area, mechanical relays have several practical advantages over other types of power control. Because of the low ohmic resistance of metallic contacts, the on state power dissipation of a relay is inherently low. This high on state efficiency allows relays to be much more compact than solid state relay technologies which must dissipate 1 to 2 watts of power per switched amp of current. The chief limitation of mechanical relays is the degradation of the contact material which is caused by electrical arcing as the contacts make and break. Breakdown of the contacts is the primary failure mechanism for mechanical relays.

Solid state based switching devices have a significant on state voltage drop and as a consequence must dissipate 1 to 2 watts of power per switched amp of current. This limitation of high power dissipation results in devices which are bulky and expensive. Additionally, the inherent high power dissipation of these devices limits their application in environments where high ambient temperatures are encountered. There is also a resulting need for large and expensive heat sinks required to deal with this wasted energy which is the inherent limitation for solid state techniques.

Inventors have attempted to solve these problems by combining a solid state relay circuit in parallel with a mechanical relay contact switch. Most of these inventions use solid state triacs (or "bi-directional thyristors") for this purpose. Some of the inventions use digital circuitry such as those shown in U.S. Pat. No. 4,074,333 issued to Murakami et al., U.S. Pat. No. 4,392,171 issued to Kornrumpf, and U.S. Pat. No. 5,528,443 issued to Itoga et al. Thus, these inventions require an additional power source for the digital components.

Still other inventions have used optically coupled triacs to avoid the digital circuitry. U.S. Pat. No. 4,855,612 issued to Koga et al., U.S. Pat. No. 5,503,907 to Nishi et al., and U.S. Pat. No. 5,283,706 to Lillemo et al. all show the use of optical coupling of a light emitting diode (LED) to a triac, thus eliminating the need for digital components. Nonetheless, the lack of digital components has also created imperfect timing. Each of these inventions uses one or more resistor-capacitor (RC) circuits to time the switching of the LED. When the control voltage is applied, the capacitor charges, causing voltage across the capacitor to increase. At a certain point after the control voltage is applied, current is forced through an induction coil, thus triggering the mechanical relay. When the control voltage is removed, the charge in the capacitor keeps the LED lit, thereby keeping the solid state relay active. At a certain point, as the charge dissipates the LED turns off, but not until the mechanical relay has had time to open.

The primary limitation of these devices is that the voltage in an RC circuit, is an exponential function in relation to time, both as the circuit charges and discharges. This creates a lack of sharp or precise turn on or turn off times. This can also create "bounce" or "flutter" in the switched device, for instance when the gate voltage of a transistor is right at the rated voltage.

It is an object of the present invention to provide a power switching device including a solid state relay and a mechanical relay operating in parallel. The solid state relay performs the make and break function of the device, while the mechanical relay carries the load current for the majority of the on time.

It is another object of this invention to provide a power switching device that has a low average power dissipation.

It is yet another object of this invention to provide a power switching device that has a long operating life by limiting arcing, partly by providing sharp switching on and off.

It is a further object of this invention to provide such a power switching device in a compact package, partly by eliminating any digital circuitry.

Other objects of the invention will become apparent from the specification described herein below.

SUMMARY OF THE INVENTION

In accordance with the objects listed above, the present invention is a hybrid power switching device including a solid state relay and mechanical relay operating in parallel. The solid state relay performs the make and break function of the device. The mechanical relay carries the load current the majority of the time, thus insuring an overall low average power dissipation.

According to one embodiment of the present invention, there is provided a hybrid power switching device including a load side and a control signal (or command signal) side. The load is coupled to a load power source by a circuit comprising a mechanical relay having mechanical contacts for making and breaking the load power source and an optically coupled semiconductor triac connected across the mechanical contacts to carry the load during the opening and closing of the mechanical relay.

According to another aspect of the present invention, there is also provided a Schmitt trigger pulse stretcher control circuit for controlling the activation time period of the mechanical relay and the optically coupled triac. The Schmitt trigger circuit is very simple and made up of a few analog components which alleviates the need for an additional power supply for the digital components. The use of the Schmitt trigger also results in sharp and discrete turn on and turn off edges for the mechanical relay and the non-zero voltage optically coupled triac, and requires minimal space for implementation.

Another significant aspect and feature of the present invention is relay contacts that never see more than one or two volts of forward voltage drop, and thus contact damage due to electrical arcing is insignificant, negligible or nonexistent, thereby improving operating life. Testing of a conventional electromechanical relay, rated for 100,000 switching cycles and adapted to incorporate the present invention has yet to produce a failure, despite more than 3,800,000 switching cycles.

Yet another significant aspect and feature of the present invention is the optically coupled triac acting as a solid state relay, only conducting during the make and break action of the device, so its average power dissipation is low, eliminating the need for a large heat sink.

Still another significant aspect and feature of the present invention is the advantages of solid state switching techniques combined with reduced power dissipation, compact size for a given current rating, and a lower cost for a given current rating, normally associated with mechanical relays.

A further significant aspect and feature of the present invention is the advantage of precise timing for switching the load on and off, which is made simple by the Schmitt trigger circuit and the use of the non-zero voltage optically coupled triac. The load will be energized for a duration equal to the input voltage signal time duration plus a length of time slightly greater than the mechanical relay release time.

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein.

DETAILED DESCRIPTION OF THE DRAWINGS

Figure 1:
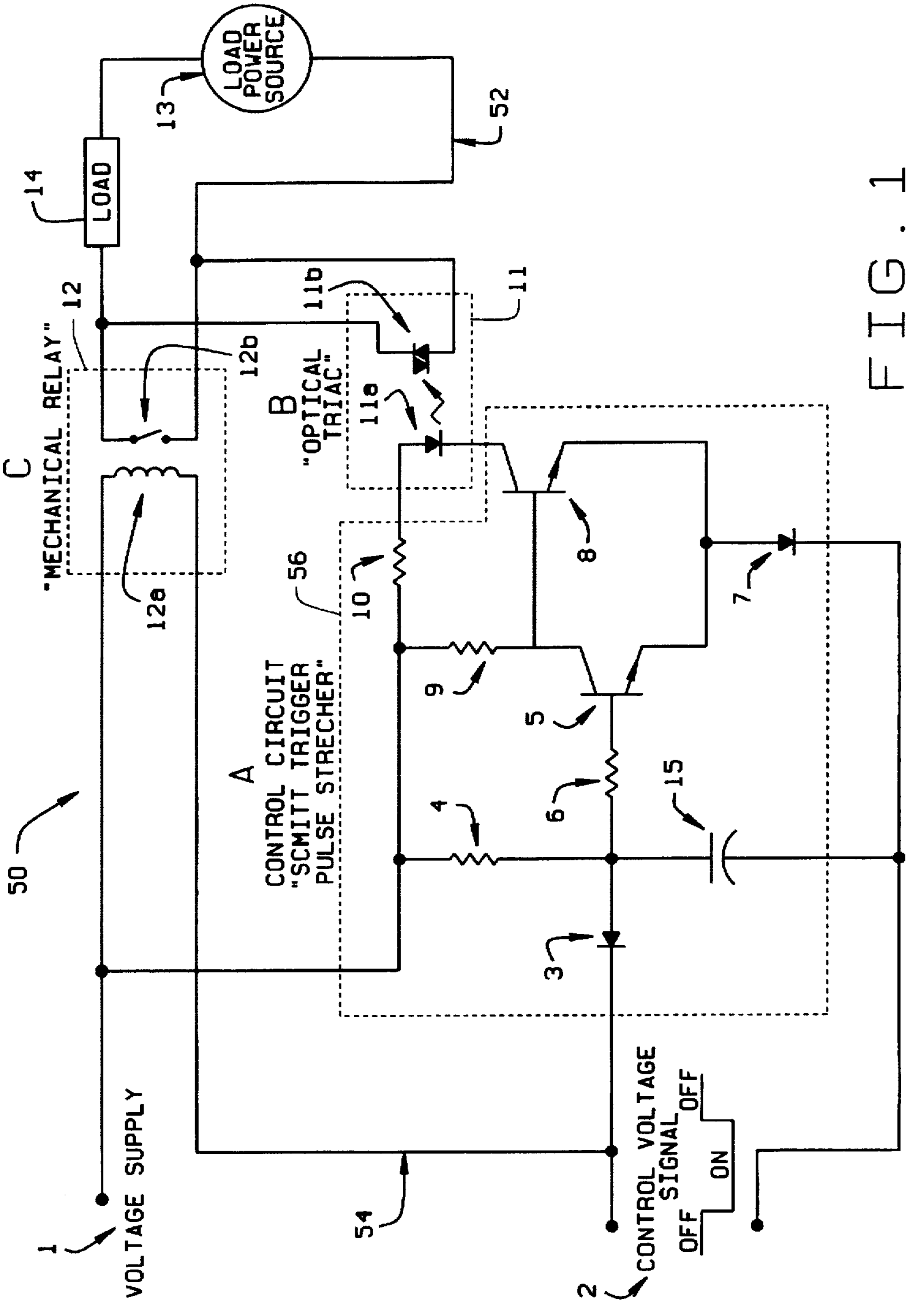
FIG. 1 is schematic diagram of the present invention.

Referring now to FIG. 1, a schematic diagram of the present hybrid power switching device 50 is shown generally. On the load side 52 the hybrid power switching device 50 has a load 14 electrically coupled to a load power source 13. The control side 54 of the hybrid power switching device 50 has a voltage supply 1 and a control voltage signal 2. The control voltage signal 2 is preferably a low level signal. That is, when it is desired that the load receive power the control voltage signal 2 should be ground voltage, and when it is desired that the load not receive power, the control voltage signal 2 should be positive. If a high level signal is used, a signal inversion must first be applied thereto.

The load side 52 and the control side 54 are operatively coupled by a mechanical relay 12 and an optically coupled triac 11. In the normal off position, the control voltage signal 2 is positive and should be equal to the voltage supply 1, thus creating no voltage differential across the induction coil 12*a* of the mechanical relay. Additionally, current will flow into the base of transistor 5 through resistor 4 and resistor 6, thus allowing current to flow from the collector to the emitter of transistor 5. The base of transistor 8 will see at most a very slight voltage, not enough to turn it on, thereby preventing current through the LED 11*a*.

Figure 2:
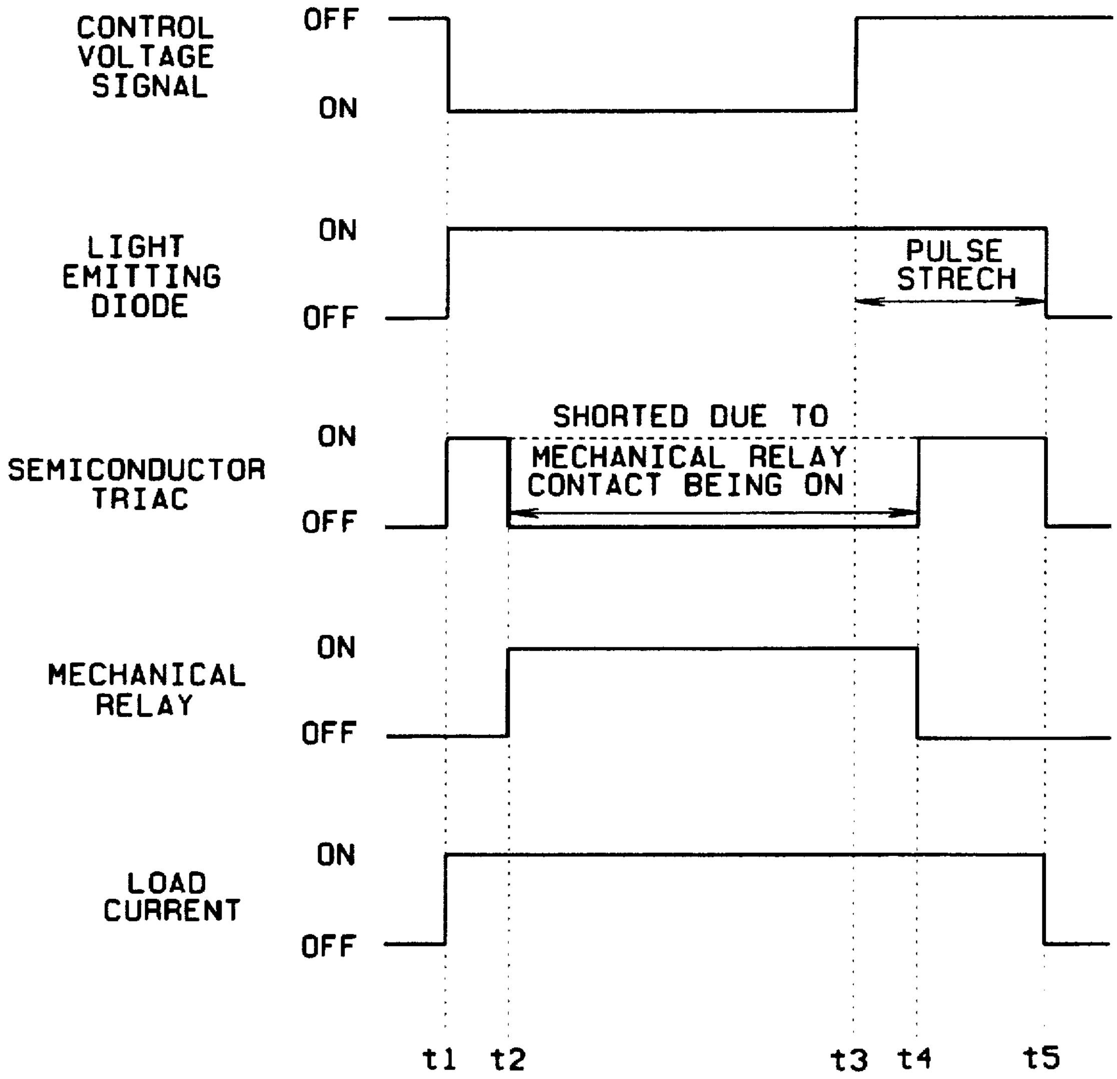
FIG. 2 is a waveform diagram showing the timing operation of the components included in the present invention.

At a certain time $t_1$, as diagrammed in FIG. 2, the control voltage signal 2 is changed to the on position (from high state to low state), so the cathode terminal of diode 3 will be at ground voltage level and the anode terminal of diode 3 will be at a voltage level equal to the voltage supply level 1 minus the voltage drop across the resistor 4. This voltage difference between the anode and the cathode (denoted $V_{d3}$) will put the diode 3 in forward-bias mode. In turn, the voltage $V_{d3}$ will be applied to the base terminal of transistor 5 through resistor 6. Voltage level $V_{d3}$ will not be sufficient to turn on transistor 5 since $V_{d3}$ must be at least equal to the voltage drop between the base and the emitter of transistor 5 (denoted $V_{be5}$) plus the voltage drop across diode 7 ($V_{d7}$) for transistor 5 to be on.

With transistor 5 being in the off mode, the voltage supply 1 will be applied to the base of transistor 8 via the current limiting resistor 9, which be sufficient to turn on transistor 8. With transistor 8 on, current will flow via the current limiting resistor 10, through the LED section 11*a* of the optically coupled triac 11, which in turn will allow current from the load power source 13 to flow through load 14 via the triac 11*b*. The mechanical relay switch 12*b* will not have closed at this point due to the inherently slow turn on (operating) time and turn off (release) time of mechanical relays. These times are significantly slower than those of the semiconductor optically coupled triac 11 due to the energizing of the magnetic coil 12*a* and the mechanical motion of the contact switch 12*b*. The magnetic coil 12*a* is also energized at $t_1$, but after a time period equal to the mechanical relay operating time the contact switch 12*b* of the mechanical relay 12 will close (denoted $t_2$). Even though the LED 11*a* will still be on at $t_2$, the extremely low resistance of the mechanical relay switch 12*b* will allow almost no current to flow through the triac 11*b* which has electrical resistance inherent in any semiconductor.

At a time $t_3$, shown in FIG. 2, the control voltage signal 2 changes to the off state (from low state to high state). The magnetic coil 12*a* of the mechanical relay will be deenergized and after a time period equal to the mechanical relay release time, the mechanical relay switch 12*b* will open (denoted $t_4$), thereby removing the short circuit across the triac 11*b*. Upon the opening of the contact switch 12*b*, current will continue to flow through the load 14 due to the triac 11*b* for a time period determined by the values of the capacitor 15 and resistor 4. After this time the optically coupled triac 11 will turn off and current will be shut off from the load 14 (denoted $t_5$).

The delay between $t_3$ and $t_5$ is accomplished through the use of a Schmitt trigger pulse stretcher 56. In operation, the control voltage signal 2 changes to high state at $t_3$. The diode 3 changes to reverse-bias mode at this point because the cathode terminal thereof will be at a higher voltage level than the anode terminal thereof. The current through resistor 4, will therefore begin to charge capacitor 15. As the capacitor 15 charges, a ramp voltage will develop at the base terminal of transistor 5 through the current limiting resistor 6. At $t_5$ equal to the time constant set by the values of the capacitor 15 and resistor 4, the base terminal of transistor 5 will reach a voltage level equal to $V_{be5}$ plus $V_{d7}$ and therefore cause transistor 5 to turn on. This will allow current to flow from resistor 9 through transistor 5, thereby robbing the base terminal of transistor 8 of current. This will turn off transistor 8 thereby shutting off LED 11*a*. Only at this point will the optical triac 11*b* cease conducting, shutting off the load 14.

Because the emitter terminals of transistor 5 and transistor 8 are connected together to a reference voltage set by diode 7, there will be a sudden snap turn off action of transistor 8 at $t_5$. This is an important characteristic of the Schmitt trigger. The other important characteristic of the present Schmitt trigger is its extremely narrow hysteresis, thereby eliminating any possibility of flutter as the load 14 is being turned off.

It is important to note that the time constant set by the values of capacitor 15 and resistor 4 should correspond to at least the full release time period of the mechanical relay ($t_4$–$t_3$). Even if the contact switch 12*b* bounces as it releases, the extra time gained by the pulse stretcher will still prevent arcing because the optical triac 11*b* will still conduct between bounces.

While the foregoing is directed to the preferred embodiments of the present invention, other and further embodiments of the invention may be devised without departing from the basic scope thereof, and the scope thereof is determined by the claims which follow.

What is claimed is:

1. A hybrid switching device without digital components comprising:

a load circuit adapted to couple to a load and a load power source;

a mechanical relay having a contact switch and a magnetic coil, said contact switch operatively coupled to said load circuit eliminating electrical current to said load when said contact switch is open, said magnetic coil closing said contact switch when an electric current is applied thereto, said contact switch having a measurable operating time to close and a measurable release time to open;

a solid state relay having a semiconductor triac optically coupled to a light emitting diode, said semiconductor triac having a first terminal electrically coupled to one side of said contact switch and a second terminal electrically coupled to the other side of said contact switch;

an input adapted to receive a control voltage signal defining an on state and an off state, said magnetic coil and said light emitting diode adapted to receive said input, said input causing said magnetic coil and said light emitting diode to be energized simultaneously when switched from said off state to said on state;

an analog pulse stretcher adapted to receive said input, said pulse stretcher maintaining a current through said light emitting diode after said input is switched from said on state to said off state; and a precision trigger coupled to said pulse stretcher, said precision trigger sharply cutting off current to said light emitting diode after said contact switch has fully opened.

2. The hybrid switching device of claim 1, wherein said precision trigger is integral with said pulse stretcher.

3. The hybrid switching device of claim 2, wherein said pulse stretcher and said precision trigger demonstrates hysteresis.

4. The hybrid switching device of claim 3, wherein said pulse stretcher and said precision trigger consist of a Schmitt trigger.

5. The hybrid switching device of claim 3, wherein the control voltage signal for said input is a low level signal.

6. The hybrid switching device of claim 3, wherein the control voltage signal for said input is a high level signal, and said hybrid switching device further comprising a signal inverter between said input and said pulse stretcher.

7. A hybrid switching device comprising:

a load side adapted to receive a load and a load power supply;

a control side having a control power supply;

a mechanical relay having a measurable operating time to close and a measurable release time to open, said mechanical relay coupling said load side to said control side;

a solid state relay coupling said load side to said control side, said solid state relay operating in parallel with said mechanical relay;

an input defining an on state and an off state indicative of the desired state of the load; and an analog control circuit receiving said input and coupled to said mechanical relay and said solid state relay, said control circuit activating said mechanical relay and said solid state relay simultaneously when said input is switched to said on state, and said control circuit opening said mechanical relay without delay when said input is switched to said off state, and opening said solid state relay after providing a delay greater than said release time of said mechanical relay.

8. The hybrid switching device of claim 7, wherein said solid state relay is a semiconductor triac optically coupled to a light emitting diode.

9. The hybrid switching device of claim 7, wherein said analog control circuit is further characterized by hysteresis.

10. The hybrid switching device of claim 9, wherein said analog control circuit is a Schmitt trigger pulse stretcher.

11. The hybrid switching device of claim 9, wherein said input is a low level signal.

12. The hybrid switching device of claim 9, wherein said input is a high level signal, and said hybrid switching device further comprising a signal inverter between said input and said control circuit.

13. A hybrid switching device comprising:

a load circuit having a mechanical contact switch and a semiconductor triac, said load circuit adapted to receive a load and a load power source;

a control circuit having a magnetic coil and a Schmitt trigger pulse stretcher, said magnetic coil causing said mechanical contact switch to close when an electrical current flows therethrough;

a light emitting diode optically coupled to said semiconductor triac, said light emitting diode turning on said semiconductor triac when an electrical current flows therethrough, the electrical current being controlled by said Schmitt trigger pulse stretcher; and an input comprising a low level signal and defining an on state and an off state indicative of the desired state of the load, said input energizing said magnetic coil and said Schmitt trigger pulse stretcher accordingly, said Schmitt trigger pulse stretcher continuing to energize said light emitting diode for a definable delay after said input is switched to the off state, then discretely turning off said light emitting diode.

* * * * *